Figure 1:
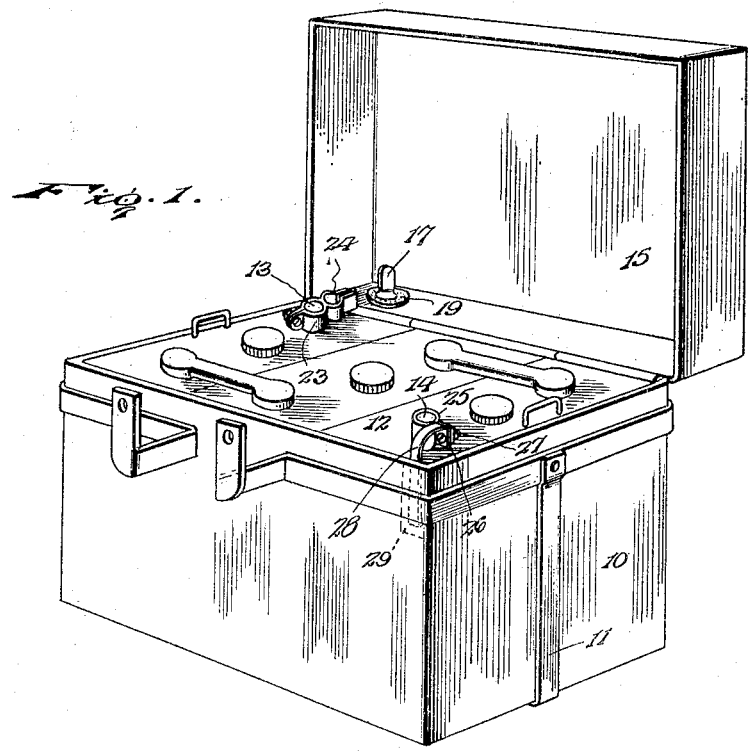

July 15, 1924.

J. E. AMEND 1,501,832

MOTOR VEHICLE BATTERY BOX

Filed June 7, 1923

Inventor

J. E. Amend.

By Lacey & Lacey, Attorney

Patented July 15, 1924.

1,501,832

UNITED STATES PATENT OFFICE.

JACOB E. AMEND, OF LOVELL, WYOMING, ASSIGNOR OF ONE-HALF TO HARRY B. RICHARDSON, OF LOVELL, WYOMING.

MOTOR-VEHICLE BATTERY BOX.

Application filed June 7, 1923. Serial No. 644,008.

*To all whom it may concern:*

Be it known that I, JACOB E. AMEND, citizen of the United States, residing at Lovell, in the county of Big Horn and State of Wyoming, have invented certain new and useful Improvements in Motor-Vehicle Battery Boxes, of which the following is a specification.

This invention relates to an improved motor vehicle battery box and seeks, among other objects, to provide a box embodying means for establishing the usual circuit connections with the battery in such manner that the battery may be slipped from the box and removed from the vehicle without the necessity for detaching any circuit wires.

The invention seeks, as a further object, to provide a battery box which will serve to efficiently house and protect the battery from, water, dust, or dirt.

And the invention seeks, as a still further object, to provide a device which may be readily employed in connection with conventional motor vehicles batteries and carriers.

Other and incidental objects will appear hereinafter.

Figure 2:
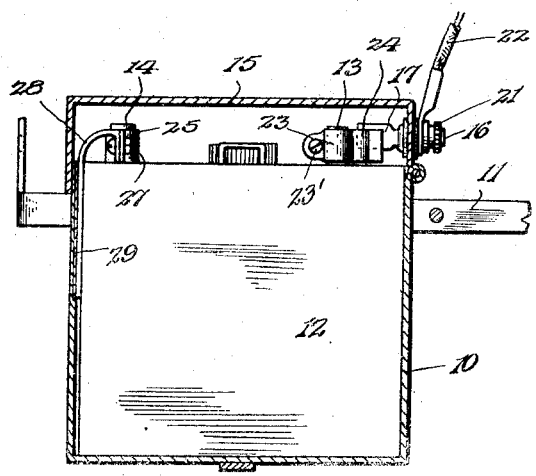
Figure 3:
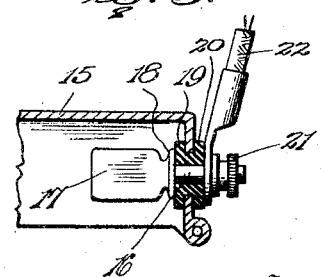

In the drawings:

Figure 1 is a perspective view of my improved battery box, the lid of the box being open, Figure 2 is a transverse sectional view through the device, and Figure 3 is a detail sectional view particularly showing the contact post carried by the lid of the box.

In carrying the invention into effect, I employ a box body 10 which is preferably formed of sheet metal and is shaped to removably fit within the usual motor vehicle battery carrier as conventionally illustrated at 11, snugly receiving the vehicle battery as conventionally illustrated at 12. The carrier 11 is, of course, connected to the frame of the vehicle chassis, as is usual, and is thus electrically grounded, while the battery is provided with the usual terminal posts 13 and 14 respectively. Hinged upon the box body at the longitudinal edge thereof is a preferably sheet metal cover 15 formed to fit down over the box body, as shown in Figure 2, closing the box body. Inserted through the rear wall of the cover from the inner side thereof is a contact post or member 16 flattened at its inner end to provide a blade 17 projecting within the cover and formed with an annular stop shoulder 18 at the base of the blade. Interposed between said shoulder and the cover is a washer 19 and surrounding the post is a bushing 20 extending at the outer side of the cover, the bushing and said washer being of suitable insulating material. Threaded upon the post at its outer end is a nut 21 adjustable for connecting the usual lead 22 of the electric system of the vehicle with the post as well as clamping the post in position upon the cover. Removably mounted upon the post 13 of the battery to cooperate with the blade 17 of the post 16 is a coacting contact member including a split sleeve 23 having confronting ears through which is engaged a bolt 23', the nut of which may be adjusted for binding the sleeve upon the post and integrally formed on said sleeve are companion oppositely bowed spring contact fingers 24 having spaced parallel outer end portions. Removably mounted upon the terminal post 14 of the battery is an electrical ground contact including a split sleeve 25 surrounding said post and provided with companion ears 26 through which is engaged a bolt or other suitable fastening device 17, the nut of which may be adjusted for binding the sleeve upon the post. Integrally formed on one of said ears is a spring contact tongue 28 which, as particularly brought out in Figure 2, is bent to extend downwardly between the adjacent side of the battery and the contiguous wall of the box body 10, and mounted upon said wall is a preferably copper plate 29 against which the tongue rests, the tongue being clamped between the battery and said plate in tight frictional contact with the plate. The tongue 28 will thus serve to electrically ground the battery to the frame of the vehicle through the plate 29, box body 10 and carrier 11.

As will now be observed, the spring fingers 24 of the contact member upon the battery post 13 are disposed to receive the blade 17 of the contact post 16 therebetween when the cover 15 is closed, frictionally coacting with the blade for establishing electrical connection between said post of the battery and the lead 22. Accordingly, when the lid 15 of the battery box is closed, the circuit through the battery will be closed. At the same time, however, the lid may, as shown in Figure 1, be readily swung open, when the battery may be slipped from the battery box and removed from the vehicle. I accordingly provide a battery box which will not only serve to house and protect the battery but will also materially facilitate the removal of the battery from the vehicle whenever occasion may so demand.

Having thus described the invention, what is claimed as new is:

A battery box including a box body shaped to fit in the battery carrier of a motor vehicle receiving a battery, a lid hinged upon the box body normally closing the box body housing the battery, a split sleeve having companion spring contact fingers, means connecting the ends of the sleeve and adjustable for clamping the sleeve to one terminal post of the battery, a coacting contact upon the lid provided at its inner end with a blade to engage between said fingers when the lid is closed, a split sleeve having a tongue to extend between the battery and the box body in electrical contact with the box body, and means connecting the ends of the latter sleeve and adjustable for clamping such sleeve upon another terminal post of the battery.

In testimony whereof I affix my signature.

JACOB E. AMEND. [L. S.]